United States Patent [19]
Beisele

[11] Patent Number: 6,001,902
[45] Date of Patent: Dec. 14, 1999

[54] WOLLASTONITE-CONTAINING CURABLE EPOXY RESIN MIXTURE

[75] Inventor: Christian Beisele, Basel, Switzerland

[73] Assignee: Ciba Specialty Chemicals Corp., Tarrytown, N.Y.

[21] Appl. No.: 09/048,821

[22] Filed: Mar. 26, 1998

Related U.S. Application Data

[63] Continuation of application No. 08/623,345, Mar. 27, 1996, abandoned.

[51] Int. Cl.$^6$ .............................. C08K 3/34; C08L 63/02
[52] U.S. Cl. ............................................. 523/466; 528/111
[58] Field of Search .............................. 523/466; 528/111

[56] References Cited

U.S. PATENT DOCUMENTS

| | | | |
|---|---|---|---|
| 4,271,061 | 6/1981 | Suzuki et al. | 260/37 |
| 4,285,853 | 8/1981 | Schreiber | 260/37 |
| 4,507,363 | 3/1985 | Chow et al. | 428/418 |
| 4,528,308 | 7/1985 | Waddill | 523/466 |
| 5,098,505 | 3/1992 | Goel et al. | 156/307.3 |
| 5,214,098 | 5/1993 | Setiabudi et al. | 525/109 |
| 5,276,073 | 1/1994 | Akutagawa et al. | 523/440 |

FOREIGN PATENT DOCUMENTS

| | | |
|---|---|---|
| 0414975 | 3/1991 | European Pat. Off. . |
| 0722964 | 7/1996 | European Pat. Off. . |
| 3229558 | 2/1984 | Germany . |
| 4206733 | 9/1993 | Germany . |
| 55-118952 | 9/1980 | Japan . |
| 62-057420 | 3/1987 | Japan . |
| 55/118952 | 9/1993 | Japan . |
| 62/057420 | 9/1993 | Japan . |

OTHER PUBLICATIONS

Derwent. Abstracts, 84–037947 [07] of DE 3,229,558.
Chemical Abstracts, 120: 165881X for EP 4,206,733.
Texaco Technical data sheets "JEFFAMINE, polyoxypropyleneamine curing agents for Epoxy Resins", 1984.

*Primary Examiner*—Robert Dawson
*Assistant Examiner*—D. Aylward
*Attorney, Agent, or Firm*—David R. Crichton; Michele A. Kovaleski

[57] ABSTRACT

A curable epoxy resin mixture consisting of
- a) 90 to 100% by weight of an aromatic glycidyl ether compound containing more than one glycidyl ether group in the molecule and 0 to 10% by weight of an epoxy resin other than aromatic polyglycidyl ethers, the sum of the epoxy resins being 100% by weight,
- b) 60 to 100% by weight of a polyoxyalkylenediamine or polyoxyalkylenetriamine and 0 to 40% by weight of a curing agent other than polyoxyalkyleneamines, the sum of the curing agents being 100% by weight,
- c) wollastonite or an inorganic filler containing more than 50% by weight of wollastonite, based on the total amount of the inorganic filler and, optionally,
- d) a curing accelerator, and
- e) glass fibres or customary additives for casting resins based on epoxy resins, is particularly suitable as casting resin composition for encapsulating, or casting in of, electrical or electronic components.

6 Claims, No Drawings

WOLLASTONITE-CONTAINING CURABLE EPOXY RESIN MIXTURE

This application is a continuation of Ser. No. 08/623,345 filed Mar. 27, 1996, now abandoned.

The present invention relates to a wollastonite-containing epoxy resin mixture based on an aromatic glycidyl ether compound and a polyoxyalkylenepolyamine as curing agent as well as to the use thereof as casting resin composition, especially for encapsulating, or casting in of, electrical or electronic components.

Casting resin compositions containing fillers and based on epoxy resins for electrical components are known. The epoxy casting resin composition disclosed, inter alia, in DE-OS 3 229 558 consisting of an aromatic and cycloaliphatic epoxy resin as well as of a modified dicarboxylic acid anhydride contains chalk as filler. This casting resin composition does not meet the requirements made of it with respect to resistance to changing temperatures.

U.S. Pat. No. 5,098,505 discloses curable mixtures consisting of an epoxy resin and a polyoxyalkylenepolyamine, which curable mixtures contain in one of their components a thermoplastic polymer as filler and are used as adhesives.

It has now been found that the curable epoxy resin mixtures based on an aromatic glycidyl ether compound and a polyoxyalkylenepolyamine and containing wollastonite as filler are valuable casting resin compositions for encapsulating or impregnating electrical or electronic components because, after curing, the coatings or impregnations have good resistance to changing temperatures and are less susceptible to tearing.

Accordingly, this invention relates to a curable epoxy resin mixture consisting of a) 90 to 100% by weight of an aromatic glycidyl ether compound containing more than one glycidyl ether group in the molecule and 0 to 10% by weight of an epoxy resin other than aromatic polyglycidyl ethers, the sum of the epoxy resins being 100% by weight, b) 60 to 100% by weight of a polyoxyalkylenediamine or polyoxyalkylenetriamine and 0 to 40% by weight of a curing agent other than polyoxyalkyleneamines, the sum of the curing agents being 100% by weight, c) wollastonite or an inorganic filler containing more than 50% by weight of wollastonite, based on the total amount of the inorganic filler and, optionally, d) a curing accelerator, and e) glass fibres or customary additives for casting resins based on epoxy resins.

Component a) of the epoxy resin mixture of this invention preferably consists only of one aromatic epoxy resin having more than one glycidyl ether group in the molecule, particularly preferably of a diglycidyl ether of a divalent phenol.

The epoxy resin mixture of this invention preferably contains as component a) only a diglycidyl ether of bisphenol A or bisphenol F.

Aromatic glycidyl ether compounds are known and some are commercially available. Said compounds may be the epoxy resins customary in epoxy resin technology, e.g. the polyglycidyl or poly(β-methylglycidyl) ethers, obtainable by reacting a compound having at least two free phenolic hydroxyl groups with epichlorohydrin or β-methylepichlorohydrin under alkaline conditions or in the presence of an acid catalyst with subsequent treatment with alkali.

The glycidyl ethers of this type are derived, for example, from mononuclear phenols, typically from resorcinol or hydroquinone, or they are based on polynuclear phenols, such as bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl)propane as well as from novolaks, obtainable by condensation of aldehydes, such as formaldehyde, acetaldehyde, chloral or furfuraldehyde, with phenols, such as phenol, or with phenols which are substituted in the nucleus by chlorine atoms or by $C_1$–$C_9$ alkyl groups, e.g. 4-chlorophenol, 2-methylphenol or 4-tert-butylphenol, or by condensation with bisphenols of the above-mentioned type.

Epoxy resin compounds other than the aromatic glycidyl ether compounds are also known and some are commercially available. Such compounds may be, for example, the polyglycidyl and poly(β-methylglycidyl) esters, obtainable by reacting a compound having at least two carboxyl groups in the molecule with epichlorohydrin or β-methylepichlorohydrin in the presence of bases.

The compounds having at least two carboxyl groups in the molecule may be aliphatic polycarboxylic acids. Typical examples of such polycarboxylic acids are oxalic acid, succinic acid, glutaric acid, adipic acid, pimelic acid, suberic acid, azelaic acid or dimerised or trimerised linoleic acid.

However, it is also possible to use cycloaliphatic polycarboxylic acids, such as tetrahydrophthalic acid, 4-methyltetrahydrophthalic acid, hexahydrophthalic acid or 4-methylhexahydrophthalic acid.

Furthermore, aromatic polycarboxylic acids can also be used, e.g. phthalic acid, isophthalic acid or terephthalic acid.

Suitable epoxy resin compounds other than the aromatic glycidyl ether compounds are also the polyglycidyl or poly(β-methylglycidyl) ethers, obtainable by reacting a compound having at least two free alcoholic hydroxyl groups with epichlorohydrin or β-methylepichlorohydrin under alkaline conditions or in the presence of an acid catalyst with subsequent treatment with alkali.

The glycidyl ethers of this type are derived, for example, from acyclic alcohols, typically from ethylene glycol, diethylene glycol, propane-1,2-diol, propane-1,3-diol, butane-1,4-diol, pentane-1,5-diol, hexane-1,6-diol, hexane-2,4,6-triol, glycerol, 1,1,1-tri-methylolpropane, pentaerythritol, sorbitol, as well as from polyepichlorohydrins. However, they are also derived from, for example, cycloaliphatic alcohols, typically 1,4-cyclohexanedimethanol, bis(4-hydroxycyclohexyl)methane or 2,2-bis(4-hydroxycyclohexyl)propane, or they have aromatic nuclei, e.g. N,N-bis(2-hydroxyethyl)aniline or p,p'-bis(2-hydroxyethylamino)diphenyl methane.

Further epoxy resin compounds suitable as mixing component a) are the poly(N-glycidyl) compounds, obtainable by dehydrochlorination of the reaction products of epichlorohydrin with amines containing at least two active hydrogens bound to amino nitrogen atoms. These amines are, for example, aniline, n-butylamine, bis(4-aminophenyl) methane, m-xylylenediamine or bis(4-methylaminophenyl) methane.

However, the poly(N-glycidyl) compounds also include triglycidyl isocyanurate, N,N'-di-glycidyl derivatives of cycloalkylene ureas, typically ethylene urea or 1,3-propylene urea, and diglycidyl derivatives of hydantoins, typically 5,5-dimethylhydantoin.

Cycloaliphatic epoxy resins are also suitable as mixing component a), typically bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl-3',4'-poxycyclohexanecarboxylate.

However, it is also possible to use epoxy resins whose 1,2-epoxy groups are bonded to different hetero atoms or functional groups. These compounds include, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

The polyoxyalkylenediamines and polyoxyalkylenetriamines used as component b) in the epoxy resin mixtures of this invention are known and some are commercially available.

The polyoxyalkylenediamines are preferably compounds of formula I or II

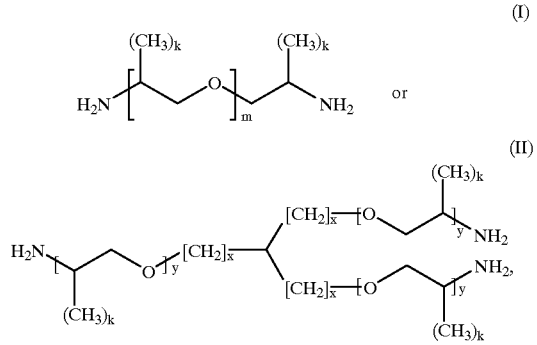

wherein each k is independently of one another 0 or 1, m is a number from 6 to 70, each x is independently of one another 0 or 1, and each y is independently of one another a number from 2 to 50.

Long-chain polyoxyalkylene chains in the cited polyamines can also be branched and can therefore contain more than 2 or 3 amino groups in the molecule.

Certain polyoxyalkyleneamines of the formula given above are commercially available under the registered trademark Jeffamine®, supplied by Texaco Chemical Co.

The polyalkyleneamine in the epoxy resin mixtures of this invention is preferably a polyoxypropylenediamine or a polyoxyethylenediamine, more preferably a polyoxypropylenediamine of formula III

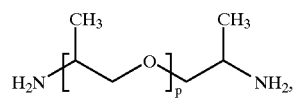

wherein p is a number from 6 to 40.

The epoxy resin curing agent of component b) which is different from the polyoxyalkyleneamines can in principle be all those customary curing agents for epoxy resins which do not react with the polyoxyalkyleneamines, e.g. dicyandiamide, polyamines and also polyols.

The polyamines used for the curable epoxy resin mixtures of this invention can be aliphatic, cycloaliphatic, aromatic or heterocyclic amines, such as ethylenediamine, propane-1,2-diamine, propane-1,3-diamine, N,N-diethylethylenediamine, hexamethylene-diamine, diethylenetriamine, triethylenetetramine, tetraethylenepentamine, N-(2-hydroxy-ethyl) diethyltriamine, N-(2-hydroxypropyl)diethyltriamine and N-(2-cyanoethyl)-diethyltriamine, 2,2,4-trimethylhexane-1, 6-diamine, 2,3,3-trimethylhexane-1,6-diamine, N,N-dimethylpropane-1,3-diamine and NN-diethylpropane-1,3-diamine, ethanolamine, m- and p-phenylenediamine, bis(4-aminophenyl)methane, aniline/formaldehyde resins, bis(4-aminophenyl)sulfone, m-xylylenediamine, bis(4-aminocyclohexyl)methane, 2,2-bis-(4-aminocyclohexyl) propane, 2,2-bis(4-amino-3-methylcyclohexyl)propane, 3-amino-methyl-3,5,5-trimethylcyclohexylamine (isophoronediamine) and N-(2-aminoethyl)-piperazine as well as polyaminoamides, for example those obtained from aliphatic polyamines and dimerised or trimerised fatty acids, and also polyamines of formula

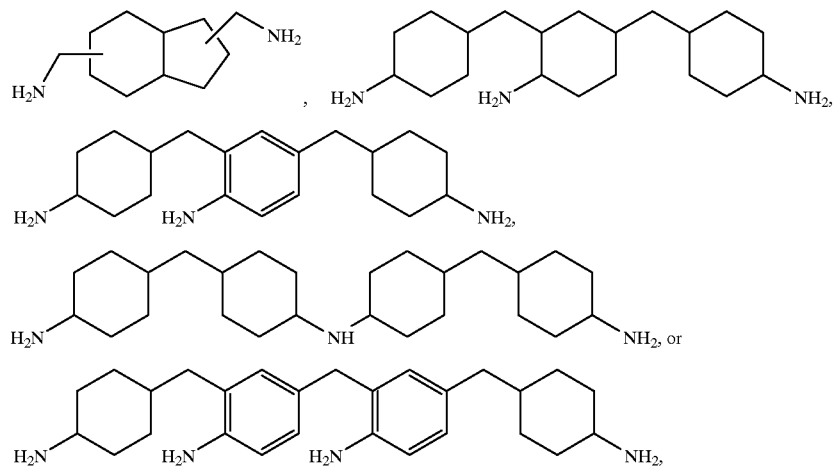

as well as mixtures of these amino compounds.

The polyamines used for the curable epoxy resin mixtures of this invention can also be the amino group-containing adducts which, as is commonly known, are obtained by the addition of amines to polyepoxy resin compounds, or the amino group-terminated polyamides which are also known compounds.

Suitable aliphatic polyols for the curable epoxy resin mixtures of this invention are typically ethylene glycol, diethylene glycol and higher poly(oxyethylene) glycols, propane-1,2-diol or poly(oxypropylene) glycols, propane-1, 3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol.

The aromatic polyols used for the curable epoxy resin mixtures of this invention may be e.g. mononuclear phenols, typically resorcinol, hydroquinone, N,N-bis(2-hydroxyethyl)-aniline, or polynuclear phenols, such as p,p'-bis(2-hydroxyethylamino)diphenylmethane, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane as well as novolaks, obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$alkyl groups, e.g. 4-chlorophenol, 2-methylphenol or 4-tert-butylphenol, or by condensation with bisphenols of the above-mentioned type.

The epoxy resin mixtures of this invention may also contain suitable curing accelerators d). For example, if dicyandiamide, polycarboxylic acids and the anhydrides thereof are used, then the accelerators may be tertiary amines or their salts, quaternary ammonium compounds or alkali metal alkoxides.

The amount of the epoxy resin curing agent b) used is determined by the chemical nature of the curing agent and by the desired properties of the curable composition and of the cured product The maximum amount can easily be determined. If the curing agent is an amine, then 0.75 to 1.25 equivalents of active hydrogen bound to amino nitrogen atoms are normally used per 1 epoxy equivalent If polycarboxylic acids or their anhydrides are used, then 0.4 to 1.1 equivalents of carboxyl group or anhydride group are normally used per 1 epoxy equivalent. If polyphenols are used as curing agents, then 0.75 to 1.25 equivalents of phenolic hydroxyl groups are used per 1 epoxy equivalent. Catalytic curing agents are generally used in amounts from 1 to 40 parts by weight per 100 parts by weight of epoxy resin.

The inorganic filler in the mixtures of this invention can be one of the customary fillers, typically powdered glass or metal, a mineral filler, such as $Al_2O_3 \cdot nH_2O$, calcite, dolomite, kaolinite or quartz, preferably in powdered form.

Component c) in the mixtures of this invention is preferably only wollastonite.

The wollastonite c) which is present in the mixtures according to this invention in an amount of more than 50% by weight, based on the total amount of the inorganic fillers, is a naturally occurring needle-shaped calcium silicate of formula $Ca_3[Si_3O_9]$ having a particle size in the micron range. The synthetically obtainable wollastonite is also needle-shaped. Wollastonite is commercially available, e.g. under the registered trade mark Nyad®, supplied by Nyco.

Component c) is preferably present in the epoxy resin mixtures of this invention in the form of powders or finely particulate needles having a particle size of less than 50 $\mu$m and in an amount of more than 50% by weight and less than 65% by weight, based on the total amount of the components present in the mixtures of this invention.

If desired, the epoxy resin mixtures of this invention may additionally contain glass fibres and, optionally, the additives e) customary in epoxy resin technology for casting resins. Such customary additives are, for example, paints, pigments, such as titanium dioxide or carbon black, processing auxiliaries, such as lubricants, flow agents, thixotropic agents, stabilisers, flame retardants, filler/resin adhesion promoters, or mould release agents.

The amount of glass fibres and conventional additives added to the epoxy resin mixtures of this invention is determined by the specific end use of the mixtures of this invention, the amount usually being less than 10% by weight, based on the total amount of the components present in the mixtures of this invention.

The mixtures of this invention are prepared by methods known per se, conveniently using known mixing units, such as stirrers, kneaders or roll mills.

The mixtures of this invention are cured to mouldings, coatings and the like in the standard known manner of epoxy resin technology by heating as described, inter alia, in "Handbook of Epoxy Resins", 1967, by H. Lee and K. Neville. The curing temperature is usually from 50 to 200° C., preferably from 80 to 130° C.

The mixtures of this invention are suitable, for example, as laminating resins or coating compositions, preferably as casting resins and in particular also as encapsulating systems for electrical or electronic components, especially for those components which are exposed to changing temperatures. As mentioned at the outset, the mouldings and coatings obtained with the curable epoxy resin mixtures of this invention are distinguished by good toughness. Because of the good toughness of the encapsulating compositions of this invention, the impregnations and coatings are less susceptible to tearing in the event of changes in temperature, both at high and at low temperatures.

Accordingly, the invention also relates to the use of the epoxy resin mixtures of this invention as casting resins and for encapsulating electrical and electronic components, in particular ignition coils having naked iron cores.

Example 1

296.7 g of a liquid diglycidyl ether of bisphenol A having an epoxy equivalent weight of 185, 0.03 g of Silicone®SH 5500, supplied by Toray Silicone Co. Ltd., Japan, as antifoam, and 3 g of γ-glycidyloxypropyltrimethoxysilane are weighed into a kneader. The mixture is heated to 80° C. and stirred at this temperature for 30 min, giving a clear solution. Subsequently, 598.2 g of needle-shaped wollastonite having an average particle size of 20 $\mu$m, 2 g of Bentone®SD-2, supplied by Kronos, and 100 g of short glass fibres having an average fibre length of <1 mm, are mixed and added to the solution obtained above. The mixture so obtained is stirred at 80° C. for a further 30 min under atmospheric pressure and then for 1 h under vacuum at 1 mbar, giving a highly viscous beige substance.

100 Parts by weight of this substance are mixed with 16.3 parts by weight of a polyoxypropylenediamine having an average molecular weight of 400, available as Jeffamine®D 400, supplied by Texaco, and then the mixture is evacuated. At 60° C., the mixture has a viscosity of 800 mPas, measured with a Mettler Rheomat 115, MS-C, and the gelling time of the mixture at 90° C. is 35 min.

The curable mixture is cured for 3 h at 100° C. to prepare mouldings having the following properties:

| | |
|---|---|
| $T_g$ value DSC*) TA 4000 (Mettler) | 40–50° C. |
| flexural strength according to ISO 178 | 100–110 MPa |
| flexural elongation according to ISO 178 | 2.0% |
| modulus of elasticity from flexural test according to ISO 178 | 10000 MPa |
| critical stress intensity factor (double torsion test)**) | 3.5 MPa √m |
| specific fracture toughness (double torsion test)**) | 1100 J/m² |

*)differential scanning calorimeter
**)measured with a compression tension machine of class 1 according to DIN 51 221

Use Example

To cast in ignition coils having naked iron cores, said coils are heated for about 2 h to 80° C. and evacuated prior to casting them in at 0.4 mbar for 2 minutes. The curable mixture of Example 1 is degassed in a storage container at 70° C. and 1 mbar. The ignition coils are then cast in at 4 mbar. The curable mixture of Example 1 has good impregnating activity for the second winding of the ignition coils. After casting, the cast ignition coils are cured for 2 h at 65° C. and for 1 h at 90° C. After an alternating temperature test of 2 h/-40° C. ⇌2h/125° C., the cast ignition coils so obtained do not exhibit any tears in the encapsulation, although the iron cores have neither been enwound nor spray-coated with a thermoplast.

What is claimed is:

1. An encapsulant for electrical or electronic components containing cured epoxy resin obtained from a curable epoxy resin mixture, consisting of
   a) 90 to 100% by weight of an aromatic glycidyl ether compound containing more than one glycidyl ether group in the molecule and 0 to 10% by weight of an epoxy resin other than aromatic polyglycidyl ethers, the sum of the epoxy resins being 100% by weight,
   b) 60 to 100% by weight of a polyoxyalkylenediamine or polyoxyalkylenetriamine and 0 to 40% by weight of a curing agent other than polyoxyalkyleneamines selected from the group consisting of dicyandiamide, a polyamine, a polyol and mixtures thereof, the sum of the curing agents being 100% by weight,
   c) more than 50% by weight, based on the total weight of the composition, of wollastonite, and, optionally
   d) a curing accelerator, and
   e) less than 10% by weight, based on the total weight of the composition, of glass fibers or additives for casting resins based on epoxy resins selected from paints, pigments, lubricants, flow agents, thixotropic agents, stabilizers, flame retardants, adhesion promoters and mold release agents, wherein the curable epoxy resin mixture has been cured at a temperature of from 50 to 200° C.

2. An encapsulant according to claim 1, wherein component a) consists of only one aromatic epoxy resin having more than one glycidyl ether group in the molecule.

3. An encapsulant according to claim 2, wherein component a) consists of a diglycidyl ether of a divalent phenol.

4. An encapsulant according to claim 2, wherein component a) consists of a diglycidyl ether of bisphenol A or bisphenol F.

5. An encapsulant according to claim 1, wherein the polyoxyalkyleneamine b) is a compound of formula I or II

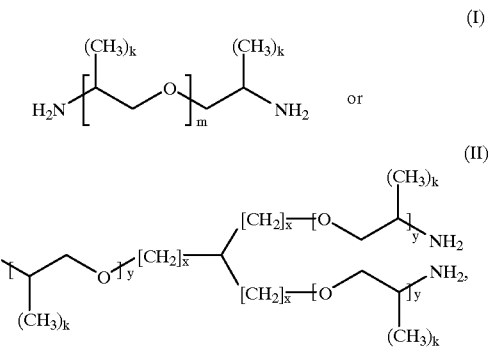

wherein each k is independently of one another 0 or 1, m is a number from 6 to 70, each x is independently of one another 0 or 1, and each y is independently of one another a number from 2 to 50.

6. An encapsulant according to claim 1, wherein the polyoxyalkyleneamine b) is a polyoxypropylenediamine of formula III

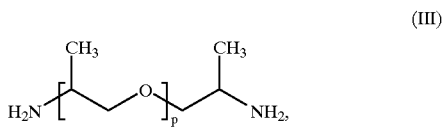

wherein p is a number from 6 to 40.

* * * * *